United States Patent
Nakano

(10) Patent No.: US 12,185,199 B2
(45) Date of Patent: Dec. 31, 2024

(54) RELAY DEVICE AND VOICE COMMUNICATION RECORDING METHOD

(71) Applicant: ICOM INCORPORATED, Osaka (JP)

(72) Inventor: Akira Nakano, Osaka (JP)

(73) Assignee: ICOM INCORPORATED, Osaka (JP)

( * ) Notice: Subject to any disclaimer, the term of this patent is extended or adjusted under 35 U.S.C. 154(b) by 320 days.

(21) Appl. No.: 17/610,501

(22) PCT Filed: May 14, 2020

(86) PCT No.: PCT/JP2020/019200
§ 371 (c)(1),
(2) Date: Nov. 11, 2021

(87) PCT Pub. No.: WO2020/235432
PCT Pub. Date: Nov. 26, 2020

(65) Prior Publication Data
US 2022/0240060 A1 Jul. 28, 2022

(30) Foreign Application Priority Data
May 17, 2019 (JP) ................................. 2019-093934

(51) Int. Cl.
*H04W 4/16* (2009.01)
*H04B 7/15* (2006.01)
(Continued)

(52) U.S. Cl.
CPC ................ *H04W 4/16* (2013.01); *H04B 7/15* (2013.01); *H04W 76/10* (2018.02)

(58) Field of Classification Search
CPC ....... H04W 4/16; H04W 76/10; H04W 76/00; H04B 7/15
See application file for complete search history.

(56) References Cited

U.S. PATENT DOCUMENTS

| 2002/0006187 A1 | 1/2002 | Lukas |
| 2011/0135069 A1 | 6/2011 | Yoshida |

(Continued)

FOREIGN PATENT DOCUMENTS

| CN | 102088520 A | 6/2011 |
| CN | 105162801 A | 12/2015 |

(Continued)

OTHER PUBLICATIONS

The extended European search report of the corresponding EP application No. 20808914.4 dated Dec. 16, 2022.
(Continued)

*Primary Examiner* — Jinsong Hu
*Assistant Examiner* — Farideh Madani
(74) *Attorney, Agent, or Firm* — Muncy, Geissler, Olds & Lowe, P.C.

(57) ABSTRACT

There is provided a relay apparatus that enables a communication voice of a specific communication terminal to be tracked and recorded. A call from a communication terminal results in establishment of a communication session in which the calling communication terminal and a called communication terminal are regarded as participating terminals. Transmission of a voice signal from any of the participating terminals in the established communication session allows the voice signal to be transmitted, together with session information, to the other participating terminal in the same communication session. A virtual device is associated with the communication terminal, and the communication terminal and the virtual device establish a virtual communication session. In the virtual communication session, the voice signal transmitted from the communication session to the virtual device is recorded in a communication monitor.

12 Claims, 14 Drawing Sheets

(51) Int. Cl.
  *H04M 1/656*  (2006.01)
  *H04W 76/10*  (2018.01)

(56) References Cited

U.S. PATENT DOCUMENTS

| | | | |
|---|---|---|---|
| 2014/0119274 A1 | 5/2014 | Uwamori | |
| 2014/0375757 A1 | 12/2014 | Asai | |
| 2016/0219085 A1* | 7/2016 | Jacobson | H04L 65/762 |
| 2016/0249274 A1 | 8/2016 | Sonobe | |
| 2016/0255202 A1 | 9/2016 | Matsushima | |
| 2016/0269546 A1 | 9/2016 | Matsushima | |
| 2017/0163332 A1 | 6/2017 | Sonobe | |
| 2017/0346950 A1* | 11/2017 | Shaltiel | H04M 3/568 |
| 2019/0281156 A1 | 9/2019 | Nagai et al. | |

FOREIGN PATENT DOCUMENTS

| | | |
|---|---|---|
| CN | 105706433 A | 6/2016 |
| CN | 109429189 A | 3/2019 |
| EP | 3251387 A1 | 12/2017 |
| EP | 3477636 A1 * | 5/2019 |
| JP | 2010-141497 A | 6/2010 |
| JP | 2011-135290 A | 7/2011 |
| JP | 2013-046116 A | 3/2013 |
| JP | 2014-087027 A | 5/2014 |
| JP | 2019-047381 A | 3/2019 |
| JP | 2020-053835 A | 4/2020 |
| JP | 2020-053838 A | 4/2020 |
| WO | 2015/068663 A1 | 5/2015 |
| WO | 2015141189 A1 | 9/2015 |
| WO | 2016/002866 A1 | 1/2016 |

OTHER PUBLICATIONS

Office action of the corresponding CN application No. 202080034670.9 mailed May 7, 2023 and English translation thereof.

* cited by examiner

Fig. 4A

TERMINAL TABLE (CALLED TERMINAL TABLE) 40

| CALL ID | KIND OF CALLING | KIND OF COMMUNICATION INSTRUMENT | ADDRESS INFORMATION (IP address, Port No.) | BELONGING WIRELESS DEVICE | PARTICIPATION SESSION NUMBER |
|---|---|---|---|---|---|
| 21 | INDIVIDUAL | ANALOG | (127.0.0.1, 30000) | | 1 |
| 22 | INDIVIDUAL | DIGITAL | (127.0.0.1, 30002) | | 2 |
| 31 | INDIVIDUAL | WLAN | (192.168.0.10, 10000) | | 2 |
| 41 | INDIVIDUAL | LTE | (192.168.0.11, 11000) | | 1 |
| 51 | INDIVIDUAL | SIP TERMINAL | (192.168.0.12, 20000) | | 2 |
| 101 | GROUP | | | 21,22,31 | 2 |
| 100 | ENTIRE | | | | |

Fig. 4B

MIXING TABLE 41

| SESSION ID | CALLING ID | DESTINATION ID | EXCLUDED TERMINAL | PARTICIPATING TERMINAL | HOLD TIME(TS) |
|---|---|---|---|---|---|
| 1 | 21 | 41 | – | 21,41,VD1 | |
| 2 | 51 | 101 | 21 | 22,31,51,VD2,VD3 | |

Fig. 4C

PRIORITY TABLE 42

| COMMUNICATION CONFIGURATION (ACCORDING TO KIND OF CALLING) | BELONGING TERMINAL |
|---|---|
| ENTIRE COMMUNICATION | 1 (HIGH) |
| INDIVIDUAL COMMUNICATION | 2 |
| GROUP COMMUNICATION | 3 (LOW) |

Fig. 4D

VIRTUAL DEVICE TABLE (FOR MONITORING SESSION) 43

| VIRTUAL DEVICE (MONITOR CHANNEL) | CALL ID |
|---|---|
| VD1 | 21 |
| VD2 | 31 |
| VD3 | 51 |
| VD4 | 101 |

Fig. 5A

VIRTUAL DEVICE TABLE
(FOR INDIVIDUAL MONITORING)  45

| VIRTUAL DEVICE (MONITOR CHANNEL) | CALL ID | DIRECTION OF VOICE STREAM |
|---|---|---|
| VD11 | 21 | UPSTREAM |
| VD12 | 22 | UPSTREAM |
| VD14 | 41 | UPSTREAM |
| VD21 | 21 | DOWNSTREAM |
| VD22 | 22 | DOWNSTREAM |
| VD23 | 31 | DOWNSTREAM |

Fig. 5B

VIRTUAL MIXING TABLE (UPSTREAM)  44-1

| SESSION ID | CALLING ID | DESTINATION ID | PARTICIPATING TERMINAL |
|---|---|---|---|
| 201 | 21 | VD11 | 21,VD11 |
| 202 | 41 | VD21 | 41,VD14 |

Fig. 5C

VIRTUAL MIXING TABLE (DOWNSTREAM)  44-2

| SESSION ID | CALLING ID (EXCLUSION ID) | DESTINATION ID | PARTICIPATING TERMINAL |
|---|---|---|---|
| 203 | 21 | VD21 | 21(out buf),VD14 |

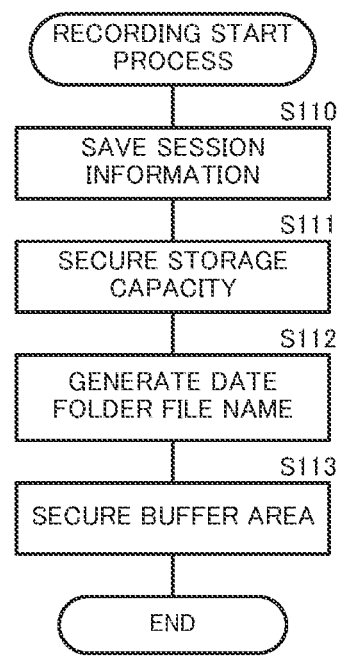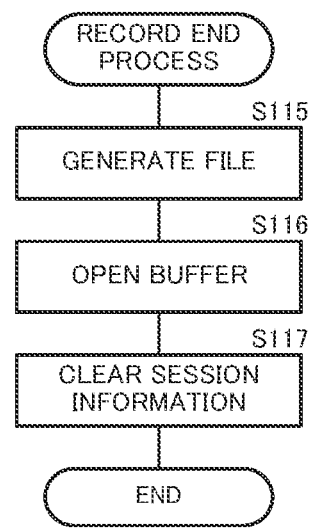
Fig. 13A
Fig. 13B

RELAY DEVICE AND VOICE COMMUNICATION RECORDING METHOD

TECHNICAL FIELD

This disclosure relates to a relay apparatus that relays a voice communication, and particularly relates to the function of recording a voice signal to be relayed.

BACKGROUND ART

Relay apparatuses that relay voice communications from wireless transceivers, telephones, and the like through networks have been proposed (see Patent Literature 1, 2, and 3). Connection between a plurality of relay apparatuses through a network enables a voice communication between different kinds of communication instruments, such as an IP telephone and a wireless device. It has been possible that when such relay apparatuses externally output relayed voice signals, the voice signals can be recorded.

CITATION LIST

Patent Literature

Patent Literature 1: Unexamined Japanese Patent Application Publication No. 2014-087027
Patent Literature 2: International Publication No. WO 2015/068663
Patent Literature 3: International Publication No. WO 2016/002866

SUMMARY OF INVENTION

Technical Problem

However, external extraction of a voice signal from a relay apparatus requires participation of a device for externally outputting the voice signal in communication, and thus requires new hardware. It will be appreciated that it is possible to enable a communication to be recorded using software. However, addition of a new recording function to a relay apparatus has had problems in that the addition is time-consuming, and in that the addition results in an increase in the load of a controller that carries out a relay process of a voice communication. Moreover, it has been further difficult to track and record a communication performed by a specific communication terminal.

Thus, an objective of the present disclosure is to provide a relay apparatus that enables a communication voice of a specific communication terminal to be tracked and recorded.

Solution to Problem

A relay apparatus of this disclosure includes a communicator, a communication session processor, and a communication monitor. The communicator communicates with a plurality of communication terminals that performs a voice communication. In the communication session processor, a call from a certain communication terminal calling the other at least one communication terminal allows the calling communication terminal and the called at least one communication terminal to be registered as participating terminals, a communication session identified based on session information is established, and transmission of a voice signal from any of the participating terminals in the established communication session allows the voice signal to be transmitted, together with the session information, to the other participating terminal in the same communication session. Further, the communication session processor notifies the communication monitor of information on the participating terminals in the communication session when the communication session is established. When the communication monitor is notified of information on a communication terminal in the case of establishing the communication session, the communication monitor executes one or both of a process of individually inputting and recording a voice signal transmitted from the communication terminal so that the voice signal is distinguished from a voice signal from the other communication terminal, and a process of recording a voice signal transmitted to the communication terminal in the communication session.

In a method of recording a voice communication of this disclosure, a relay apparatus that communicates a plurality of communication terminals performing a voice communication executes the following procedures. A call from a certain communication terminal calling the other at least one communication terminal allows the calling communication terminal and the called at least one communication terminal to be registered as participating terminals, and a communication session identified based on session information is established. Transmission of a voice signal from any of the participating terminals in the established communication session allows the voice signal to be transmitted, together with the session information, to the other participating terminal in the same communication session. While the communication session is established, one or both of a process of individually inputting and recording a voice signal transmitted from a preset communication terminal to be monitored so that the voice signal is distinguished from a voice signal from the other communication terminal, and a process of recording a voice signal transmitted to the communication terminal in the communication session are executed.

In the disclosure described above, it is also acceptable that: the communication monitor sets a virtual device associated with either an input buffer in which a voice signal transmitted from the communication terminal to be monitored, of which the voice signal is recorded, is buffered, or an output buffer in which a voice signal transmitted to the communication terminal to be monitored is buffered; when the communication monitor is notified of information on the communication terminal to be monitored in a case in which the communication session is established, the communication monitor allows the communication terminal to be monitored and the virtual device to establish a virtual communication session; and the communication monitor records a voice signal transmitted to the virtual device in the virtual communication session.

In the disclosure described above, it is also acceptable that the plurality of virtual devices is disposed, and the communication monitor separately records, in parallel, voice signals transmitted to the plurality of virtual devices.

In the disclosure described above, it is also acceptable that: the communication session processor notifies the communication monitor of information on a terminal participating in the communication session in a case in which the communication session is cancelled; and the communication monitor ends recording of a voice signal of a communication terminal when the communication monitor is notified of information on the communication terminal in a case in which the communication session is cancelled.

In the disclosure described above, it is also acceptable that the communication monitor buffers the voice signal in volatile memory, and stores the buffered voice signal as a file in a nonvolatile storage apparatus when the buffered voice signal reaches a size set in advance.

Advantageous Effects of Invention

In accordance with this disclosure, a communication voice of a communication terminal participating in a communication session can be acquired so that the communication voice is separate from a voice signal of another communication terminal, and the voice can be recorded.

BRIEF DESCRIPTION OF DRAWINGS

FIG. 4A is a view illustrating a terminal table disposed in a relay apparatus;

FIG. 4B is a view illustrating a mixing table disposed in the relay apparatus;

FIG. 4C is a view illustrating a priority table disposed in the relay apparatus;

FIG. 4D is a view illustrating a virtual device table disposed in the relay apparatus;

FIG. 5A is a view illustrating a virtual device table disposed in the relay apparatus;

FIG. 5B is a view illustrating a virtual mixing table disposed in the relay apparatus;

FIG. 5C is a view illustrating a virtual mixing table disposed in the relay apparatus;

FIG. 13A is a flow chart illustrating a recording start process;

FIG. 13B is a flow chart illustrating a recording end process;

DESCRIPTION OF EMBODIMENTS

Figure 1:
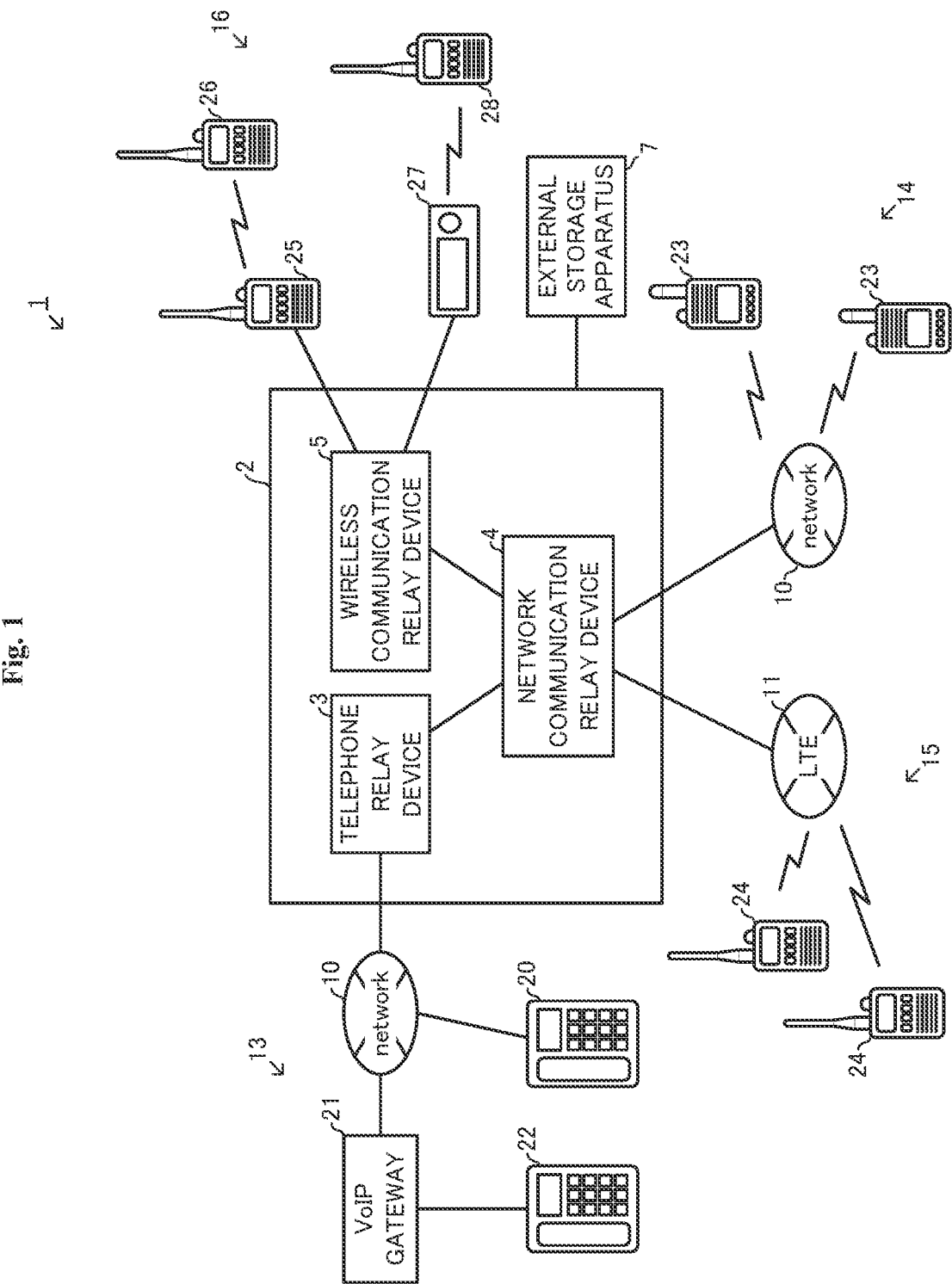
FIG. 1 is a block diagram of a voice communication system.
Figure 2:
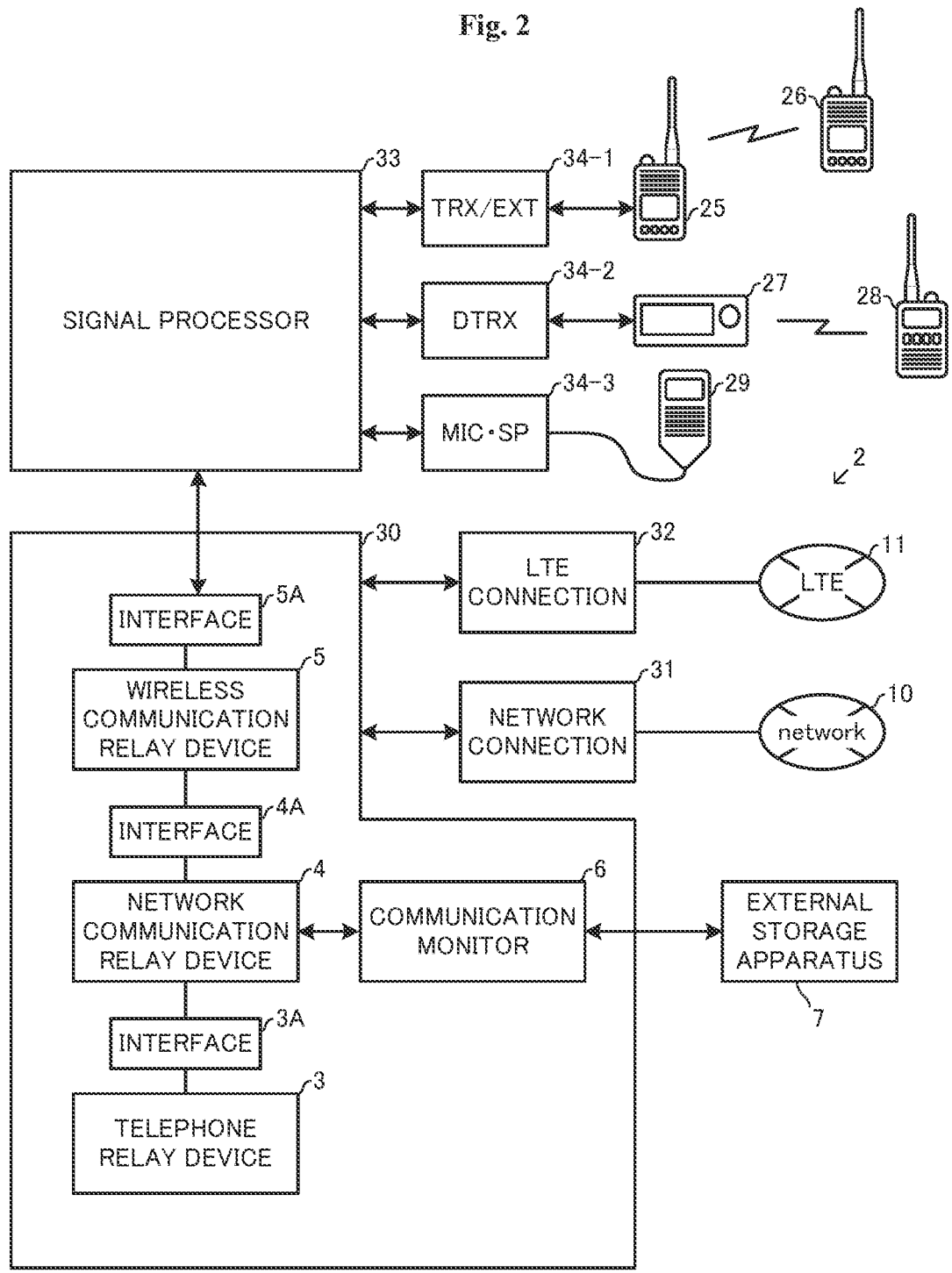
FIG. 2 is a block diagram of a relay apparatus.

A voice communication system of this disclosure will be described with reference to the drawings. FIG. 1 is a configuration view of a voice communication system 1 which is an embodiment of this disclosure. FIG. 2 is a view illustrating the configuration of a relay apparatus 2.

The voice communication system 1 is a system that implements voice communications between a plurality of communication terminals by relay performed by the relay apparatus 2. Examples of the communication terminals are an SIP telephone 20, an extension telephone 22, a WLAN transceiver 23, an LTE transceiver 24, an analog transceiver 26, and a digital transceiver 28, described below. These communication terminals are apparatuses that transmit and receive voice signals in forms different from each other, and the relay apparatus 2 relays voice communications between these communication terminals of which the kinds are different from each other.

The relay apparatus 2 can monitor the voice of a communication. When two or more communication terminals communicate with each other, the relay apparatus 2 establishes a communication session for this communication. Voice signals transmitted and received in communication sessions, in which communication terminals or groups, registered as targets for monitoring sessions in advance in a virtual device table 43 (see FIG. 4), participate, are monitored. When a communication terminal registered as a target for individual monitoring in advance in a virtual device table 45 (see FIG. 5) participates in a communication session, a voice signal transmitted from the communication terminal is individually monitored (so that the voice signal is separated from a voice signal transmitted from another communication terminal). The monitoring is one or both of recording and voice output.

In FIG. 1, the relay apparatus 2 relays voice communications between a plurality of communication systems consisting of an IP telephone system 13, a WLAN transceiver system 14, an LTE transceiver system 15, and a wireless communication system 16. Therefore, the relay apparatus 2 includes a telephone relay device 3, a network communication relay device 4, and a wireless communication relay device 5.

The IP telephone system 13 is connected to the telephone relay device 3. The IP telephone system 13 includes: the SIP telephone 20 and a VoIP gateway 21 that are connected to a network 10; and the extension telephone 22 that is connected to the VoIP gateway 21. The VoIP gateway 21 includes a PBX function, and is also connected to a telephone line (outside line).

The network 10 including a wireless access point (not illustrated) and an LTE communication network 11 including a base station (not illustrated) are connected to the network communication relay device 4. The WLAN transceiver system 14 is formed on the network 10, and the LTE transceiver system 15 is formed on the LTE communication network 11. The WLAN transceiver system 14 includes the WLAN transceiver 23 that accesses the network 10 through the wireless access point. The LTE transceiver system 15 includes the LTE transceiver 24 that accesses the LTE communication network 11 through the base station. The configuration and function of the network communication relay device 4 are described in detail in "International Publication No. WO 2015/068663" which is a prior application made by the present applicant.

The wireless communication relay device 5 includes a plurality of external instrument interfaces 34 as shown in FIG. 2. A wireless transceiver (repeater) 25 using an analog method and a wireless transceiver (repeater) 27 using a digital method are connected to the external instrument interfaces 34, respectively. The repeater 25 communicates with the handy wireless transceiver (analog transceiver) 26 using a similar analog method. The repeater 27 communicates with the handy wireless transceiver (digital transceiver) 28 using a similar digital method. The configuration and function of the wireless communication relay device 5 are described in detail in "Unexamined Japanese Patent Application Publication No. 2014-087027" and "International Publication No. WO 2016/002866" which are prior applications made by the present applicant.

FIG. 2 is a block diagram of the relay apparatus 2. The relay apparatus 2 includes the telephone relay device 3, the network communication relay device 4, the wireless communication relay device 5, and a communication monitor 6, which are implemented principally in a functional manner (software manner). The relay apparatus 2 includes a controller 30. The controller 30 is configured by a computer including a CPU, a ROM, a RAM, and the like. An external storage apparatus 7, a network connection 31, an LTE connection 32, and a signal processor 33 are connected to the controller 30. A voice file in which a communication voice of a communication terminal is recorded is stored in the external storage apparatus 7, which is a nonvolatile and large-capacity storage apparatus such as, for example, a USB hard disk. The network connection 31 is connected to the network 10. The LTE connection 32 is connected to the LTE communication network 11. In FIG. 1, the networks 10 connected to the telephone relay device 3 and the network communication relay device 4 are described separately from each other; however, both the networks may be the same.

In the relay apparatus 2, cooperation between software and hardware including the controller 30 allows the telephone relay device 3, the network communication relay device 4, the wireless communication relay device 5, and the communication monitor 6 to be functionally implemented. The telephone relay device 3 includes an interface 3A for transmitting and receiving a voice signal and the like to and from the network communication relay device 4. The network communication relay device 4 includes an interface 4A for transmitting and receiving a voice signal and the like to and from the wireless communication relay device 5. Moreover, the wireless communication relay device 5 includes an interface 5A for transmitting and receiving a voice signal and the like to and from the signal processor 33. The signal processor 33 extracts a voice signal from an RTP packet input from the controller 30 (interface 5A), converts the voice signal into a digital or analog signal wave, and outputs the signal wave to any of the external instrument interfaces 34. Moreover, the signal processor 33 compresses a digital or analog voice signal input from any of the external instrument interfaces 34, encodes the voice signal, packetizes the voice signal into an RTP packet, and inputs the RTP packet into the controller 30 (interface 5A).

The three external instrument interfaces 34 (34-1 to 34-3) are disposed, and are respectively the analog interface 34-1, the digital interface 34-2, and the analog (hand microphone/speaker) interface 34-3. FIG.2 illustrates a state in which the repeaters 25 and 27 are connected to the analog interface 34-1 and the digital interface 34-2, respectively.

The network communication relay device 4 relays a communication between WLAN transceivers 23, a communication between LTE transceivers 24, and a communication between a WLAN transceiver 23 and an LTE transceiver 24. Moreover, the network communication relay device 4 relays a communication between the SIP telephone 20 or the extension telephone 22 (hereinafter referred to as "telephone 20 or 22") and the WLAN transceiver 23 or the LTE transceiver 24, and a communication between the telephone 20 or 22 and the wireless transceiver 26 or 28, in response to a call from the telephone relay device 3. Moreover, the control of a communication session and the mixing of voice signals, described later, are executed by the network communication relay device 4. The network communication relay device 4 corresponds to the communication session processor of the present disclosure.

The telephone relay device 3 receives a call from the SIP telephone 20 or the extension telephone 22, determines a communication instrument (destination wireless device) which is a communication partner which is a destination for the call, and inputs information on the destination wireless device and a voice signal received from the telephone 20 or 22 into the network communication relay device 4. The whole or a part of the wireless communication relay device 5 including the telephone relay device 3, the network communication relay device 4, and the signal processor 33 corresponds to the communicator of the present disclosure.

The communication monitor 6 monitors the voice of a communication session in which a communication terminal to be monitored, among a plurality of communication terminals, participates. As described above, the monitoring is recording and/or voice output. The following discussion is a description of the recording. A recorded voice (voice file) is stored in the external storage apparatus 7.

Figure 3:
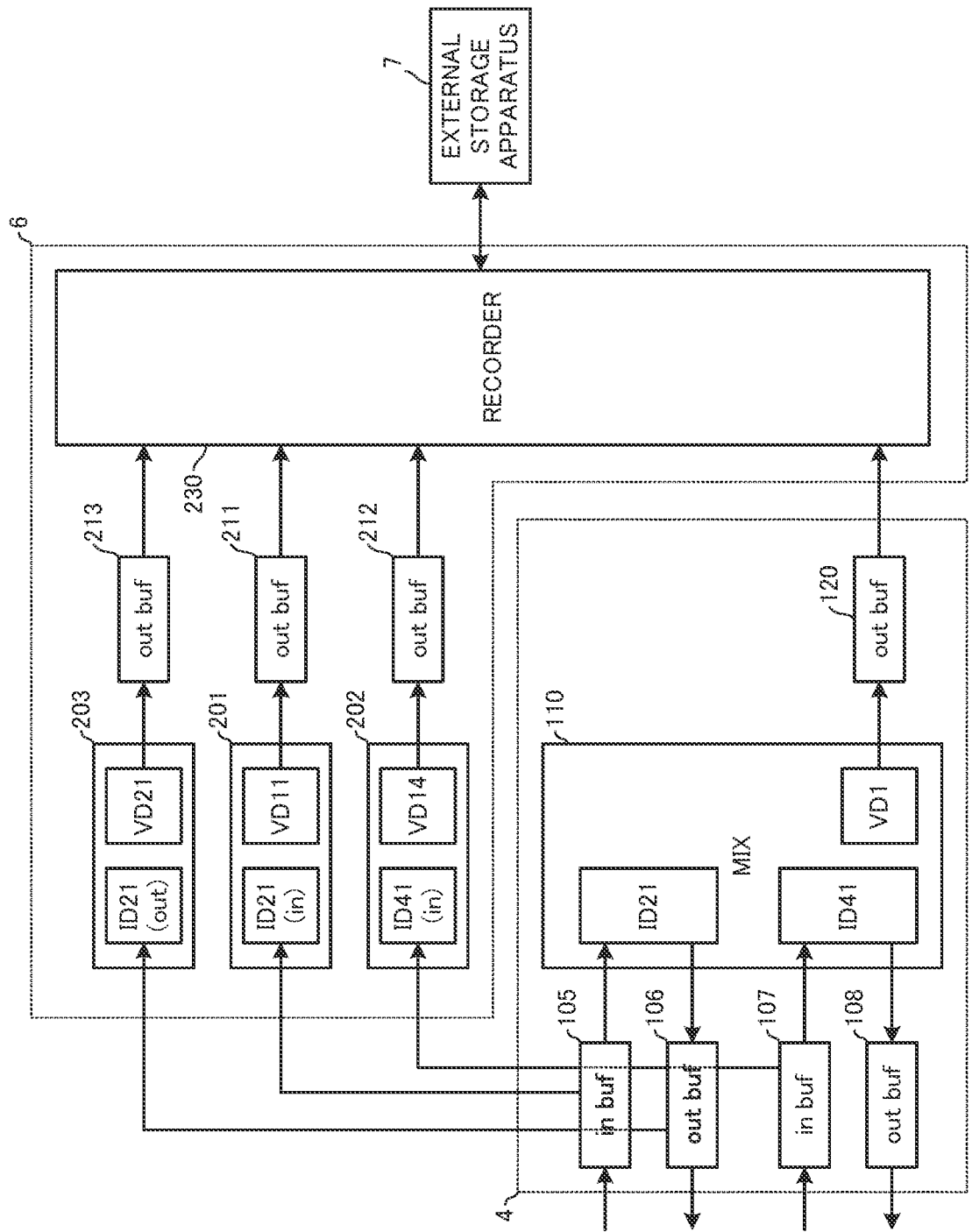
FIG. 3 is a functional block diagram of a network communication relay device and a communication monitor.

FIG. 3 is a functional block diagram illustrating a communication session established by the network communication relay device 4, and monitoring of communication performed by the communication monitor 6. When the network communication relay device 4 establishes a communication session, the communication session is registered in a mixing table illustrated in FIG. 4B, and the network communication relay device 4 performs mixing transfer of a voice signal of a communication terminal participating in the communication session. FIG. 3 illustrates the functional block diagram of the communication session identified with a session ID "1" in the mixing table in FIG. 4B.

(Actual) communication terminals identified with IDs of 21 and 41 participate in the communication session ID 1, and a virtual device VD1 for monitoring a session is associated with the communication terminal ID 21 in the communication terminals (see FIG. 4D). Accordingly, the virtual device VD1 as well as the communication terminal ID 21 and the communication terminal ID 41 participate in the communication session ID 1, and echo cancel mixing transfer (described later) is performed by a mixer 110.

A voice signal transmitted from the communication terminal ID 21 which is an analog transceiver is buffered from the wireless communication relay device 5 into an input buffer 105, and the voice signal buffered in the input buffer 105 is taken into the mixer 110. The voice signal transmitted from communication terminal ID 41 which is an LTE transceiver is buffered from the LTE connection 32 into an input buffer 107, and the voice signal buffered in the input buffer 107 is taken into the mixer 110 (communication session ID 1). In the mixer 110, only a voice signal received from the communication terminal ID 41 is transferred to the communication terminal ID 21. The voice signal to be transferred is buffered in an output buffer 106, and acquired by the signal processor 33. In the mixer 110, only a voice signal received from the communication terminal ID 21 is transferred to the communication terminal ID 41. The voice signal to be transferred is buffered in an output buffer 108, and acquired by the LTE connection 32.

In the mixer 110, the voice signals received from the communication terminal ID 21 and the communication terminal ID 41 are mixed, and transferred to the virtual device VD1. The voice signals to be transferred are buffered in an output buffer 120, and acquired by a recorder 230 in the communication monitor 6. The recorder 230 allows the mixed voice signals to be accumulated in a recording buffer.

Whenever the buffered voice signal reaches a predetermined size, the recorder 230 forms the voice signals into a file.

Moreover, virtual devices VD11 and VD21 for individual monitoring are associated with the communication terminal ID 21 (see FIG. 5A). The individual monitoring is the function of monitoring (recording) only a voice signal transmitted and received by a single communication terminal to be monitored even when communication sessions (intercommunications) are carried out in a plurality of communication terminals, as described above. The virtual device VD11 is a virtual device disposed for monitoring only an upstream voice signal of the communication terminal ID 21 to be monitored (a voice signal received from the communication terminal ID 21). The virtual device VD21 is a virtual device disposed for monitoring a downstream voice signal of the communication terminal ID 21 to be monitored (a voice signal transmitted to the communication terminal ID 21). The virtual device VD11 is associated with the input buffer (in buf) 105 of the communication terminal ID 21, and the virtual device VD21 is associated with the output buffer (out buf) 106 of the communication terminal ID 21. Moreover, a virtual device VD14 for individually monitoring an upstream signal is associated with the communication terminal ID 41, and the virtual device VD14 is associated with the input buffer 107 of the communication terminal ID 41.

For individual monitoring, virtual communication sessions ID 201, ID 202, and ID 203 are established in the communication monitor 6 (see FIGS. 5B and 5C). The virtual communication session ID 201 in which the upstream voice signal of the communication terminal ID 21 is monitored is a communication session in which only the communication terminal ID 21 (input buffer 105) and the virtual device VD11 participate. In the virtual communication session ID 201, a voice signal received from the communication terminal ID 21 and buffered in the input buffer 105 is transferred to the recorder 230 via the virtual device VD 11 (output buffer 213). The recorder 230 allows the transferred voice signal to be accumulated in the recording buffer. Whenever the buffered voice signal reaches a predetermined size, the recorder 230 forms the voice signal into a file.

The virtual communication session ID 202 in which the upstream voice signal of the communication terminal ID 41 is monitored is a communication session in which only the communication terminal ID 41 (input buffer 107) and the virtual device VD14 participate. In the virtual communication session ID 202, a voice signal received from the communication terminal ID 41 and buffered in the input buffer 107 is transferred to the recorder 230 via the virtual device VD 14 (output buffer 212). The recorder 230 allows the transferred voice signal to be accumulated in the recording buffer. Whenever the buffered voice signal reaches a predetermined size, the recorder 230 forms the voice signal into a file.

The virtual communication session ID 203 in which the downstream voice signal of the communication terminal ID 21 is monitored is a communication session in which only the communication terminal ID 21 (output buffer 106) and the virtual device VD21 participate. Since the virtual device VD21 is associated with the output buffer 106 of the communication terminal ID 21, a voice signal of another communication terminal that communicates with the communication terminal ID 21 is input into the virtual communication session ID 203 in the actual communication session ID 1. The communication terminal ID 21 is a terminal excluded in the virtual communication session ID 203. Since the communication session ID 1 is an individual communication between the communication terminal ID 21 and the communication terminal ID 41, a voice signal recorded in the virtual communication session ID 203 is similar to a voice signal recorded in the virtual communication session ID 202. In the case of group communication in which three or more communication terminals participate (for example, a communication session ID 2), voice signals of the three or more communication terminals, transmitted to a communication terminal to be monitored, can be monitored. In the virtual communication session ID 203, voice signals mixed in the mixer 110 and buffered into the output buffer 106 in the actual communication session ID 1 are transferred to the recorder 230 via the virtual device VD 21. The recorder 230 allows the transferred voice signals to be accumulated in the recording buffer. Whenever the buffered voice signal reaches a predetermined size, the recorder 230 forms the voice signals into a file.

Information on each communication terminal is registered in a terminal table (called terminal table) 40 illustrated in FIG. 4A. A user who intends starting a communication calls a communication terminal, which is a communication partner, with a communication terminal possessed by the user. A calling message is generated by such a calling manipulation, and transmitted to the relay apparatus 2. When the calling message is received by the relay apparatus 2, the relay apparatus 2 registers a communication session corresponding to the calling message in a mixing table 41 illustrated in FIG. 4B (establishes the communication session), and calls the communication terminal which is the communication partner. As a result, the communication between the communication terminals is started.

Figure 6:
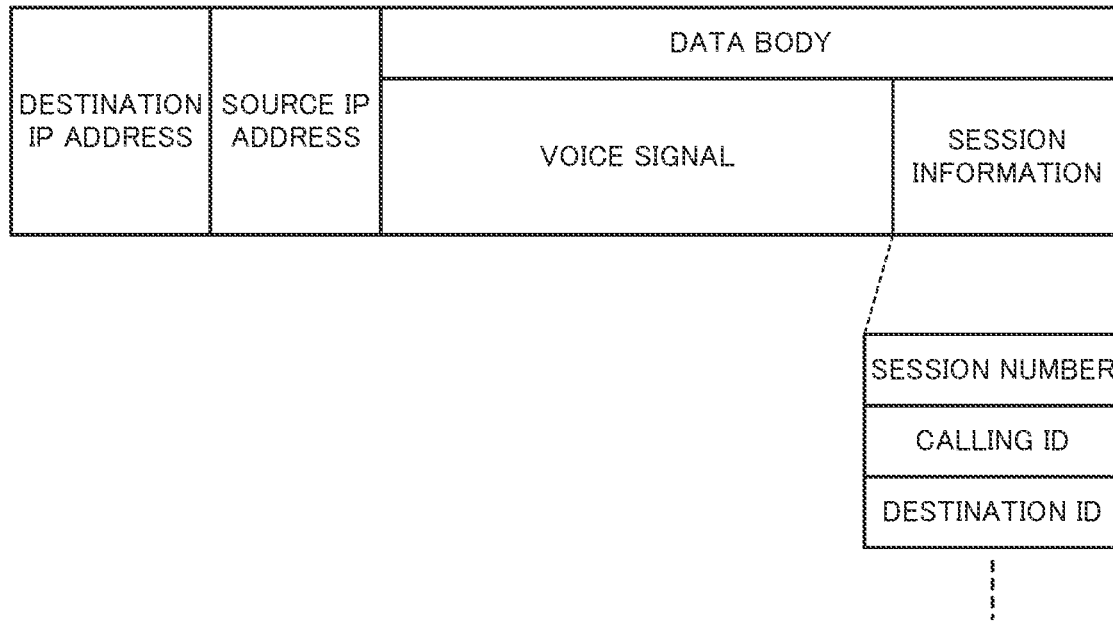
FIG. 6 is a view illustrating the configuration of a voice packet.

Each of the communication terminals except the telephones 20 and 22 starts a communication by transmitting an RTP packet in which a voice signal is stored as a data body. In other words, the communication is started in a form such as a wireless transceiver in which a communication is started by pressing a PTT switch. The RTP packet that is first transmitted when the communication is started is referred to as a calling packet. The calling packet functions as a calling message. The RTP packet used in the voice communication system 1 is configured as illustrated in FIG. 6. When the telephone 20 or 22 starts a communication, first, an SIP message (INVITE) is transmitted to the relay apparatus 2. According to an SIP procedure, the relay apparatus 2 establishes a communication session with another communication instrument. In the following description, a case will be described in which a communication terminal such as the WLAN transceiver 23 transmits a calling packet to thereby establish a communication session.

The various tables disposed in the controller 30 of the relay apparatus 2 will be described with reference to FIGS. 4 and 5. FIG. 4A is a view illustrating the terminal table (called terminal table) 40. The information on the communication terminals and groups registered in the voice communication system 1 is stored in the terminal table 40. A plurality of communication terminals belongs to each group (including the entire). When a group is called, a plurality of communication terminals belonging to the group are called all at once. In association with each communication terminal, there are stored an identification number (ID), address information for accessing the communication terminal, and a participation session number representing a communication session in which the communication terminal participates. In association with each group, the identification numbers of communication terminals belonging to the group are stored. The identification number (ID) corresponds to the identification information of the present disclosure.

A calling kind is information representing the form of a communication executed in the case of calling the ID. An "individual" communication is a one-to-one communication between individual communication terminals. A "group" communication is a communication in which voice signals are exchanged between a plurality of (commonly, three or more) communication terminals. An "entire" communication is a communication in which voice signals are exchanged between all communication terminals that are connected to the network 10, the LTE communication network 11, and the external instrument interfaces 34, and that can perform communications.

When a communication terminal calls another communication terminal, the communication terminal transmits, to the relay apparatus 2, an RTP packet (voice packet) in which the identification number (destination ID) of the called communication terminal is written. FIG. 6 is a view illustrating the configuration of the RTP packet used in the voice communication system. The RTP packet includes a header and a data body (payload), and a destination address and a source address are described in the header. The data body includes a voice signal for voice communication, and session information. The session information is information on a communication session registered in the mixing table 41 in FIG. 4B, and is written for identifying the communication session to which the RTP packet belongs. The session information includes a session number, a destination ID, and a calling ID. In the case of a calling packet which is a voice packet that is first transmitted when a communication is started, the session number is blank because a communication session for the voice packet has not yet been established (the communication session has not been registered in the mixing table 41).

FIG. 4B is a view illustrating the mixing table 41. Established and executed communication sessions are registered in the mixing table 41. The relay apparatus 2 transfers a voice signal, received from a communication terminal participating in such a communication session, to another communication terminal participating in the communication session. When a plurality of voice signals is simultaneously input, the voice signals are mixed, and transmitted to the communication terminal. Even in the case of mixing voice signals and transmitting the voice signals to each communication terminal, the relay apparatus 2 subjects the voice signals to echo cancel mixing based on each communication terminal and transmits the voice signals so that a voice signal transmitted by a certain communication terminal is prevented from going back to the communication terminal.

For each communication session, columns of a session ID, a calling ID, a destination ID, a participating terminal, an excluded terminal, and a hold time timer (TS) are disposed in the mixing table 41. The session IDs are numbers for identifying such communication sessions, and assigned serially in order of establishment (in order of registration) of the communication sessions. The identification number of a communication terminal that makes a call (transmits a calling packet) is stored in the column of the calling ID. The identification number of a communication terminal or group called based on the calling packet is stored in the column of the destination ID.

The identification number of a communication terminal participating in such a communication session is registered in the column of the participating terminal. Moreover, the identification number of a communication terminal that is called in (belongs to) such a communication session and that does not participate in the communication session because of participating and communicating in another communication session is registered in the column of the excluded terminal. When a voice signal is transmitted from a communication terminal (participating terminal) of which the identification number is registered in the column of the participating terminal, the controller 30 transfers the voice signal to another participating terminal.

In the case of a group communication session, the identification number of a calling terminal and the identification number of a communication terminal belonging to a group designated as a communication partner are registered in the column of the participating terminal. However, since a communication terminal participating in another communication session even when belonging to the group is incapable of participating in the group communication session, the communication terminal is excluded from the participating terminal, and the identification number of the communication terminal is registered in the column of the exclusion terminal. In a case in which the calling terminal is a communication terminal that does not belong to the group, that is, in a case in which the calling terminal calls a group other than the group to which the calling terminal belongs, the identification number of the calling terminal is also registered in the column of the participating terminal. In the case of an entire communication session, all communication terminals that can perform communications are registered as participating terminals.

Hold time in each communication session is set at, for example, 30 seconds. The hold time timer (TS) in the mixing table 41 is a timer counted down when a voice signal is not transmitted from any participating terminal. The hold time timer TS is reset (set at 30 seconds) and counted down in a communication session management process (see FIG. 11). When a voice signal is not transmitted from a participating terminal for 30 seconds, and the hold time timer TS reaches the conclusion of a predetermined elapsed time, such a communication session is canceled, and information on the communication session is deleted from the mixing table 41.

FIG. 4C is a view illustrating a priority table 42. The priority of a communication based on the kind of calling is stored in the priority table 42. The priority is represented in terms of a numerical value, and the lower value represents the higher priority. In a case in which a communication terminal is redundantly called from a plurality of communication sessions, a communication session in which the communication terminal is allowed to participate is determined based on the priorities in the priority table 42. Examples of the case in which such a communication terminal is redundantly called from a plurality of communication sessions include a case in which the communication terminal is simultaneously called from the plurality of communication sessions, and a case in which the communication terminal participating in a communication session is called from another communication session.

When the priority of a current communication session and the priority of a new communication session are identical to each other, a communication terminal continues to participate in the current session, and does not shift to the new communication session. Even in a case in which the priorities are identical to each other, the relay apparatus 2 may allow the communication terminal to shift to the new communication session. The content of the priority table 42 is not limited thereto, and, for example, the individual communication session may be set at a priority of 1.

FIG. 4D is a view illustrating the virtual device table (for monitoring a session) 43. The call IDs (identification numbers) of communication terminals or groups to be monitored are stored in the virtual device table 43. A communication terminal or group to be monitored is referred to as "target for monitoring session" in the following description. When a communication session in which a communication terminal having such a call ID participates is established, the communication monitor 6 records a voice signal transmitted and received in the communication session. A virtual device attached to a target for monitoring is disposed for recording the voice signal. For example, the virtual device VD1 is disposed in correspondence with the communication terminal ID 21 (analog transceiver 26) which is a target for monitoring. The virtual device is a virtual device for acquiring a voice signal for recording from the network communication relay device 4 that performs mixing transfer of a voice signal. The communication monitor 6 allows the virtual device to participate together in a communication session in which the target for monitoring participates. As a result, the network communication relay device 4 outputs a voice signal, as a voice signal transmitted to a virtual device at the time of mixing, to the communication monitor 6. As a result, the communication monitor 6 acquires all the voice signals of communication sessions in which targets for monitoring participate. When a target for monitoring is removed from a communication session, a virtual device is also removed together from the session. While recording the voice signal of the communication session of the target for monitoring, or without recording the voice signal, the communication monitor 6 may output the voice signal to a speaker or the like to allow a user to listen to the voice signal.

FIG. 5A is a view illustrating the virtual device table 45 in which virtual devices for individual monitoring are registered, and FIGS. 5B and 5C are views illustrating virtual mixing tables 44 in which virtual communication sessions for individual monitoring are registered. Virtual communication sessions for upstream individual monitoring, in which virtual devices for individually monitoring upstream signals, described later, participate, are registered in the virtual mixing table 44-1 illustrated in FIG. 5B. A virtual communication session for downstream individual monitoring, in which a virtual device for individually monitoring a downstream signal, described later, participate, is registered in the virtual mixing table 44-2 illustrated in FIG. 5C. In this embodiment, a virtual mixing table is divided into the virtual mixing table for upstream individual monitoring (FIG. 5B) and the virtual mixing table for downstream individual monitoring (FIG. 5C); however, it is also acceptable to make these virtual mixing tables into one table without dividing the virtual mixing table into the virtual mixing tables. This is because a stream direction can be determined based on a virtual device ID even in the case of unifying the virtual mixing table for upstream individual monitoring and the virtual mixing table for downstream individual monitoring.

The call IDs (identification numbers) of communication terminals to be monitored are stored in the virtual device table 45 illustrated in FIG. 5A. The communication terminal to be monitored is referred to as "target for individual monitoring" in the following description. Examples of virtual devices include upstream virtual devices VD11, VD12, and VD14 that monitor upstream signals to be monitored, and downstream virtual devices VD21, VD22, and VD23 that monitor downstream signals to be monitored. The upstream signal is a voice signal received from a communication terminal to be monitored. The downstream signal is a voice signal transmitted to a communication terminal to be monitored. In the virtual device table 45 in FIG. 5A, virtual devices for both upstream individual monitoring and downstream individual monitoring are disposed in communication terminals ID 21 and ID 22, respectively. The virtual device for downstream individual monitoring is disposed in a communication terminal ID 31. The virtual device for upstream individual monitoring is disposed in the communication terminal ID 41.

In the case of establishing an actual communication session in which a communication terminal, with which a virtual device for upstream individual monitoring is associated, participates, the communication monitor 6 establishes a virtual communication session in which the communication terminal and the associated virtual device participate, and registers the virtual communication session in the virtual mixing table 44-1. In the virtual mixing table 44-1, columns of a session ID (=201 or 202), a calling ID, a destination ID, and a participating terminal are disposed for virtual communication sessions which are virtually established by the communication monitor 6. The calling ID is the ID (=21 or 41) of a communication terminal to be monitored. The destination ID is the identification number (=VD11 or VD14) of a virtual device associated with a communication terminal. The ID of a communication terminal to be monitored, and the ID of a virtual device associated with the communication terminal are stored in the column of the participating terminal.

In the case of establishing an actual communication session in which a communication terminal, with which a virtual device for downstream individual monitoring is associated, participates, the communication monitor 6 establishes a virtual communication session in which the output buffer of the communication terminal and the associated virtual device participate, and registers the virtual communication session in the virtual mixing table 44-2. In the virtual mixing table 44-2, columns of a session ID (=203), a calling ID, a destination ID, and a participating terminal are disposed for virtual communication sessions which are virtually established by the communication monitor 6. The calling ID is the ID (=21) of a communication terminal to be monitored, and the communication terminal is registered as an excluded terminal. The destination ID is the identification number (=VD21) of a virtual device associated with a communication terminal. The ID (output buffer) of a communication terminal to be monitored, and the identification number (=VD21) of a virtual device associated with the communication terminal are stored in the column of the participating terminal.

The details thereof will be described later with reference to flow charts. The communication monitor 6 continuously buffers the voice of a communication session in which a target for monitoring participates, and separates the voice into chunks each having a predetermined size (for example, into chunks of 100 MB) to form each chunk into a file. Whenever a communication session in which a target for monitoring participates is changed, for example, whenever the communication session is started/shifted/ended, the communication monitor 6 forms a buffered voice signal into a file.

The relay apparatus 2 transfers voice packets (voice signals), input from communication terminals through the network 10, the LTE communication network 11, and the external instrument interfaces 34, to other communication terminals through the network 10, the LTE communication network 11, and the external instrument interfaces 34. In the case of group communication, voice signals are transmitted to a plurality of communication terminals belonging to the group. Moreover, in the case of the group communication, it is possible that users using the plurality of communication terminals speak simultaneously, and voice packets are simultaneously transmitted from the plurality of communication terminals. In this case, the relay apparatus 2 mixes the voice signals of the plurality of voice packets to edit a new voice packet, and transmits the new voice packet to each communication terminal. All voice signals are mixed and transmitted to communication terminals to which the voice signals have not been transmitted. To communication terminals that have transmitted voice signals, voice signals, other than the excluded voice signals transmitted by the communication terminals, are mixed and transmitted. As a result, in a communication terminal that has transmitted a voice signal, the echo of the voice signal transmitted by the communication terminal itself is prevented from being generated. Mixing is also carried out in a manner similar to that of the group communication in the case of performing a communication in the manner of an entire communication. Since a virtual device does not transmit a voice signal, all the voice signals of the communication session are transmitted to the virtual device.

Figure 7:
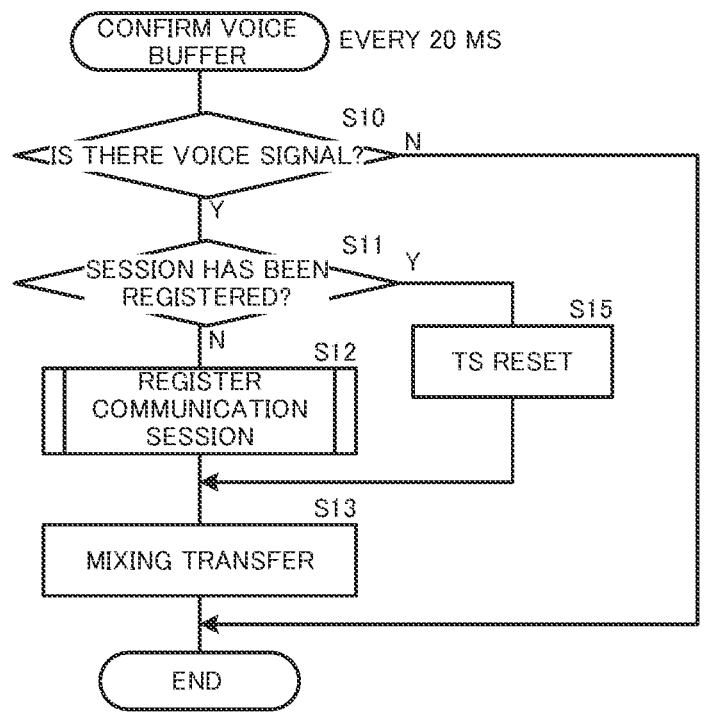
FIG. 7 is a flow chart illustrating a process in the case of receiving a voice packet.

The operations of the relay apparatus 2 will be described with reference to the flow charts in FIGS. 7 to 14. FIG. 7 illustrates a voice buffer confirmation process operation. The controller 30 regularly (for example, every 20 milliseconds) checks an input buffer (in buffer) in which a voice signal received from a communication terminal is intended to be buffered, and determined whether the voice signal is buffered (S10). When the voice signal is not buffered (NO in S10), the controller 30 ends the buffer confirmation process operation. When the voice signal is buffered (YES in S10), the controller 30 reads the session information of the voice packet of the voice signal determines whether a communication session has been already registered in the mixing table 41 (S11). When the communication session has been already registered in the mixing table 41 (YES in S11), the controller 30 resets the hold time timer TS in the mixing table 41 at 30 seconds (S15), and transfers the voice signal of the received voice packet to a communication terminal participating in the communication session (S13). The controller 30 determines the communication terminal participating in the communication session with reference to the column of the participating terminal in the mixing table 41.

When the communication session of the received voice packet is not registered in the mixing table 41 (NO in S11), the voice packet is a calling packet. The controller 30 performs a communication session registration process for registering the new communication session of the calling packet in the mixing table 41 (S12), and transfers the voice signal of the received voice packet to a communication terminal participating in the communication session (S13). The communication session registration process will be described below with reference to the flow chart in FIG. 8.

Figure 8:
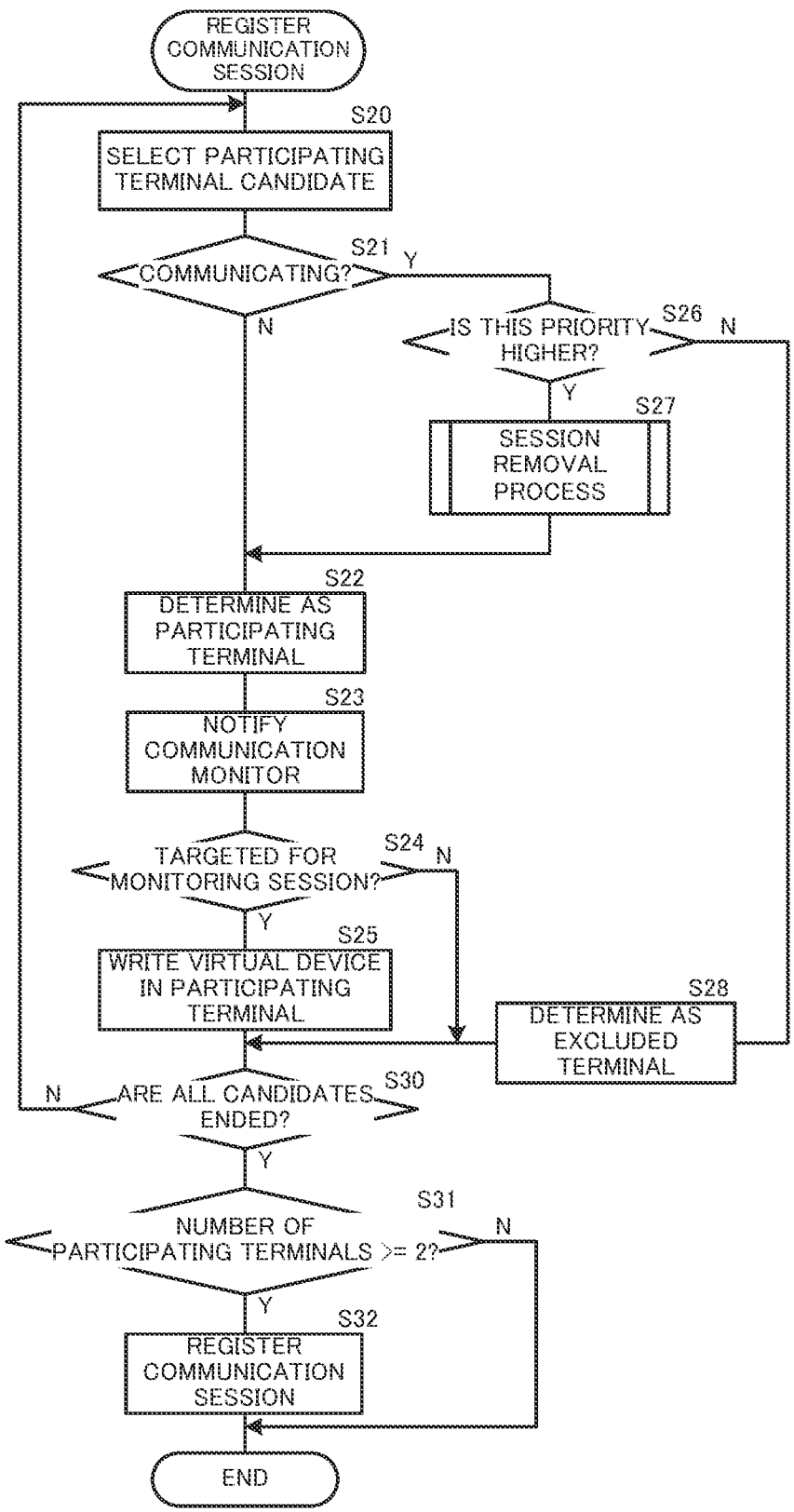
FIG. 8 is a flow chart illustrating a communication session registration process.

FIG. 8 is a flow chart illustrating the communication session registration process executed in S12 in FIG. 7. The controller 30 extracts participating terminal candidates including calling terminals and called communication terminals in the new communication session on the basis of destination IDs and calling IDs included in the received calling packet, and selects one of the participating terminal candidates (S20). Then, the controller 30 determines whether or not a communication terminal which is the participating terminal candidate is currently participating (communicating) in another communication session (S21). When the communication terminal is not communicating (NO in S21), the controller 30 determines the communication terminal as a participating terminal in a communication session established this time (S22), and transmits, to the communication monitor 6, a message for providing a notification that the communication terminal (the communication terminal selected in S20) starts a communication (S23). When the communication terminal selected in S20 is a target for individual monitoring, the communication monitor 6 starts individual monitoring of the communication terminal in response to the notification. Then, it is determined whether the communication terminal is a communication terminal which is a target for monitoring a session (S24). When the communication terminal is the communication terminal which is the target for monitoring a session (YES in S24), a virtual device VDn associated with the communication terminal is also included as such a participating terminal (S25).

In contrast, when the communication terminal is communicating in S21 (YES in S21), the controller 30 compares the priorities of the communication session in which the communication terminal currently participates, and the new communication session established this time (S26). When the priority of the new communication session is higher (YES in S26), the controller 30 executes a removal process of removing the communication terminal from the communication session in which the communication terminal currently participates (S27), and determines the communication terminal as a terminal participating in the new communication session (S22). A message for providing a notification that the communication terminal starts a communication is transmitted to the communication monitor 6 (S23). When the communication terminal is a target for monitoring (YES in S24), a corresponding virtual device VDn is also included as a participating terminal (S25).

When the priority of the new communication session is equal to or less than the priority of the communication session in which the communication terminal currently participates in S26 (NO in S26), the controller 30 determines the communication terminal as an exclusion terminal in the new communication session (S28). The controller 30 repeats the processes S20 to S28 for all the participating terminal candidates (S30).

When the above-described processes are executed for all the participating terminal candidates (YES in S30), the controller 30 determines the number of communication terminals determined as participating terminals (S31). When the number of the participating terminals except virtual devices is two or more (YES in S31), the controller 30 registers the new communication session in the mixing table 41 (S32), and ends the processes. When the number of the participating terminal is less than two (NO in S31), the controller 30 determines that the new communication session is not established, and ends the registration process without registering the new communication session in the mixing table 41.

A communication session may be registered even when a communication terminal which is a participating terminal candidate becomes an excluded terminal, and the number of a participating terminal is less than two, in the process. In such a case, an intercommunication is not established, and therefore, the communication session is canceled by the communication session management process (see FIG. 11) after a lapse of the time-up time (hereinafter referred to as "hold time TS") of the hold time timer TS.

Figure 9:
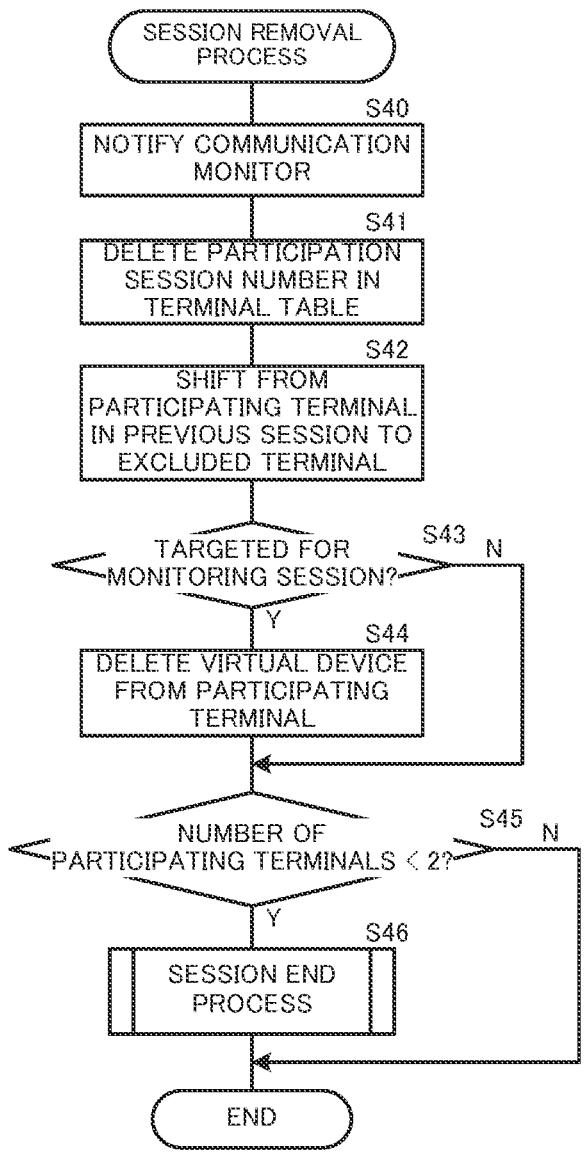
FIG. 9 is a flow chart illustrating a session removal process.

The session removal process executed in S27 in FIG. 8 will be described with reference to FIG. 9. The process is a process of removing a communication terminal participating in a communication session from the communication session in which the communication terminal currently participates, in order to shift the communication terminal to another communication session having a higher priority, as illustrated in FIG. 8. The controller 30 transmits, to the communication monitor 6, a message for providing a notification that the communication terminal is removed from the communication session (S40). The controller 30 deletes the participation session number in the terminal table 40 (S41), and shifts the identification number of the communication terminal from the column of the participating terminal in the communication session, in which the participating terminal currently participates, in the mixing table 41, to the column of the excluded terminal (S42). The controller 30 determines whether the communication terminal is a target for monitoring a session (S43). When the communication terminal is the target for monitoring a session (YES in S43), the controller 30 deletes the virtual device VDn from the column of the participating terminal (S44). As a result, the session monitoring in the communication session is ended. When the number of a terminal participating in the communication session is allowed to be less than two by removing the communication terminal (YES in S45), the controller 30 executes a session end process for the communication session (S46). When the communication terminal to be monitored is removed from the communication session in the process, recording is immediately started in a communication session in which the communication terminal is intended to newly participate (S24 to S25 in FIG. 8). Even when the number of a participating terminal is less than two, a communication session may be maintained until a lapse of hold time TS without immediately ending the communication session.

Figure 10:
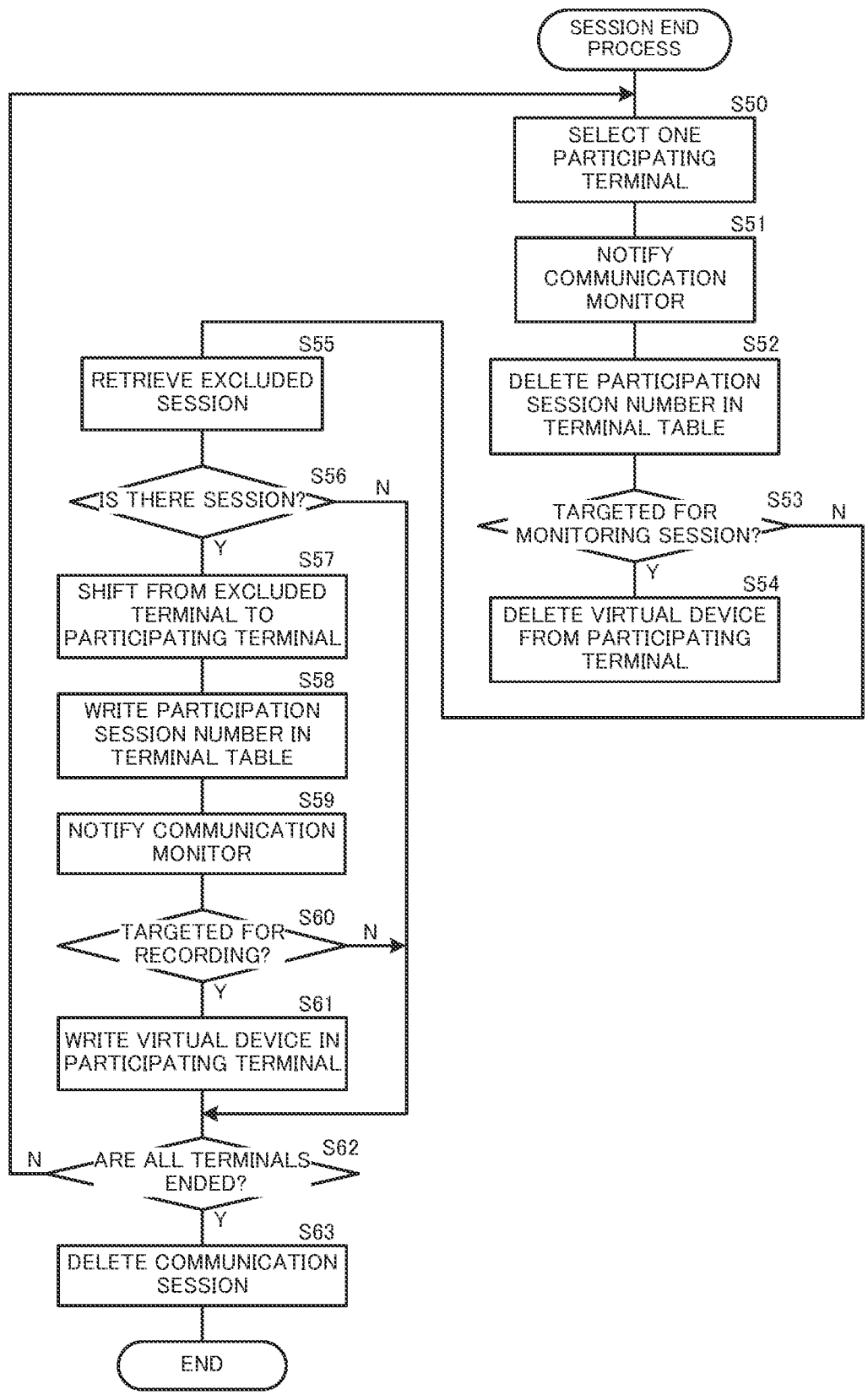
FIG. 10 is a flow chart illustrating a communication session end process.

FIG. 10 is a flow chart illustrating the session end process. The process is executed when the voice of a communication session stops and hold time TS (for example, 30 seconds) elapses while keeping silence, and when the number of a terminal participating in a communication session is less than two. The controller 30 selects one terminal participating in a communication session to be ended (S50), and transmits, to the communication monitor 6, a message that communication of the communication terminal is ended (S51). When the communication terminal selected in S50 is a target for individual monitoring, and a voice is being recorded, the communication monitor 6 ends the monitoring of the communication terminal in response to such a notification. The communication monitor 6 deletes the participation session number of the communication terminal in the terminal table 40 (S52). The communication monitor 6 determines whether the communication terminal is a target for monitoring a session (S53). When the communication terminal is the target for monitoring a session (YES in S53), the communication monitor 6 deletes a virtual device VDn from the column of the participating terminal (S54).

It is retrieved whether the identification number of the communication terminal is registered in the column of the excluded terminal in the other communication sessions registered in the mixing table 41 (S55). When a communication session exists in which the communication terminal is an excluded terminal (YES in S56), the communication terminal is allowed to participates in the communication session in which the communication terminal is excluded. Therefore, the controller 30 performs the following process. The identification number of the communication terminal is shifted from the column of the excluded terminal of the communication session to the column of the participating terminal (S57), the session number of the communication session is written in the column of the participation session number of the communication terminal in the terminal table 40 (S58), and a message for providing a notification that the communication terminal participates in the middle of the communication session and a communication is started is transmitted to the communication monitor 6 (S59). When the communication terminal is a target for individual monitoring, the communication monitor 6 starts recording of a voice signal of the communication terminal in response to the notification. Then, it is determined whether the communication terminal is a target for monitoring a session (S60). When the communication terminal is the target for monitoring a session (YES in S60), the communication monitor 6 writes a virtual device VDn in the column of the participating terminal in the communication session (S61). The communication monitor 6 executes the processes S50 to S61 for all the participating terminals (YES in S62), then deletes the communication session (S63) from the mixing table 41, and ends the session end process.

Figure 11:
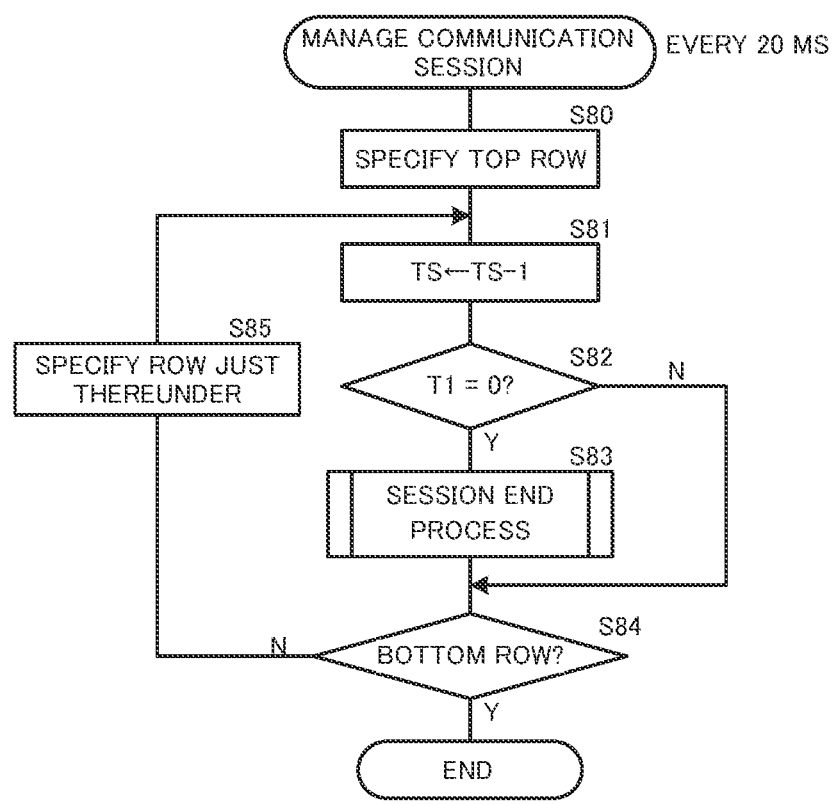
FIG. 11 is a flow chart illustrating a communication session management process.

FIG. 11 is a flow chart illustrating a communication session management process. The communication session management process is a process in which the silence time of a communication session registered in the mixing table 41 is counted, and the communication session is ended at the time of a lapse of predetermined hold time (30 seconds). The process is regularly (for example, every 20 milliseconds) repeatedly executed. First, the controller 30 specifies the communication session in the top row in the mixing table 41 (S80). The controller 30 subtracts one count (equivalent to 20 milliseconds) from the hold time timer TS of the specified communication session (S81), and determines whether or not the subtraction causes the hold time timer TS to be zero (S82). When the hold time timer TS is zero (YES in S82), the controller 30 determines that the communication session is ended, and deletes the session end process for the communication session in the row (S83, FIG. 8). The controller 30 manages the mixing table 41 by performing the above-described process in turn until reaching the bottom row in the mixing table 41 (S84, S85).

Figure 12:
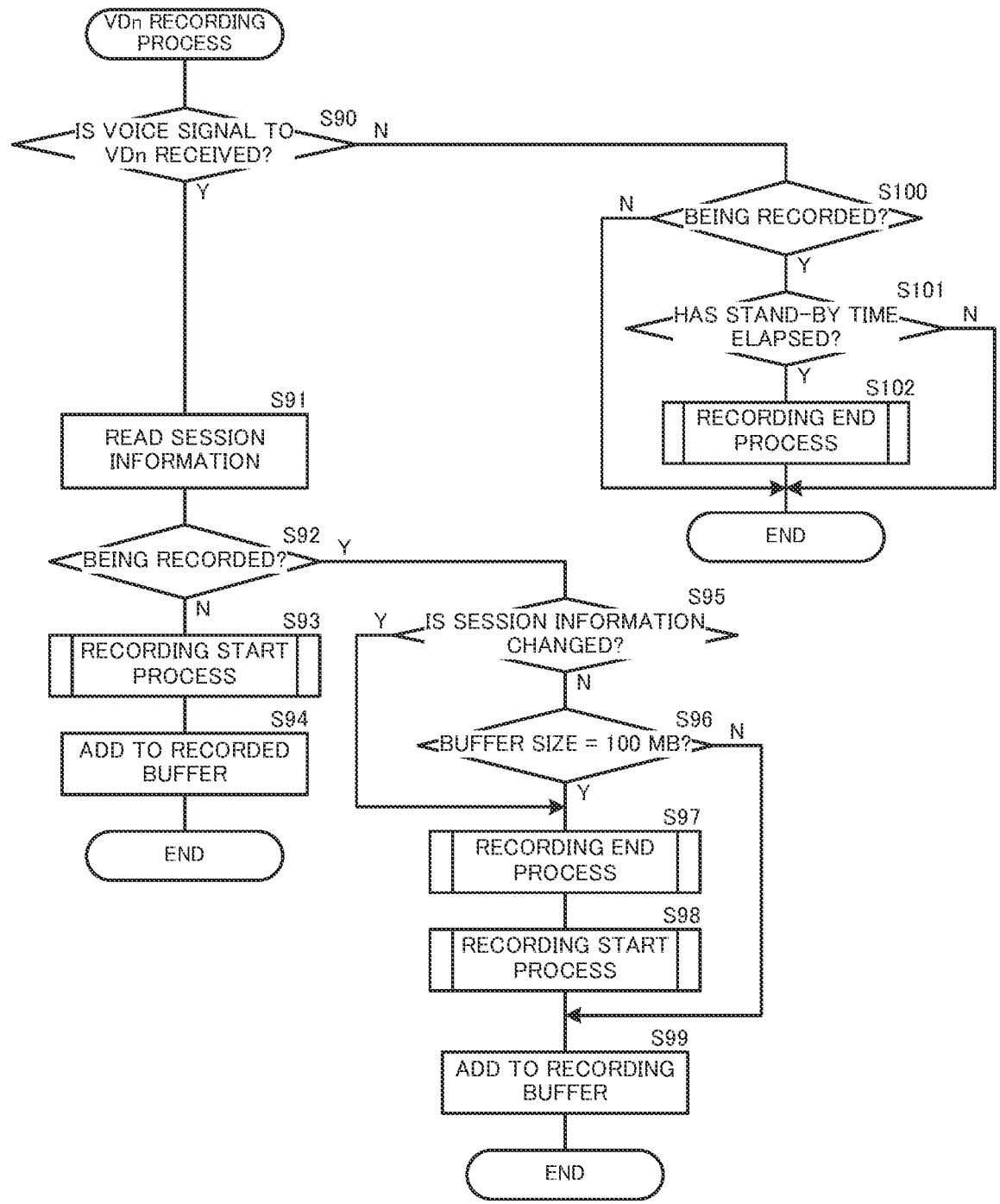
FIG. 12 is a flow chart illustrating a recording process.

FIGS. 12 and 13 are flow charts illustrating a recording process operation executed by the communication monitor 6 of the controller 30. The process is executed at intervals of a certain period of time (20 ms) for each of virtual devices VDn (n=1 to 4). First, in FIG. 12, the communication monitor 6 determines whether or not a voice signal (voice packet) destined for a virtual device VDn for monitoring a session is received (S90). When the voice packet is received (YES in S90), the communication monitor 6 reads session information included in the data body of the voice packet. A session ID and the like are described in the session information. The communication monitor 6 determines whether or not the voice signal of the communication session is being recorded (S92). When the voice signal is not being recorded (NO in S92), the communication monitor 6 determines that the first voice packet of the communication session has been received, and executes a recording start process (S93).

The recording start process will now be described with reference to the flow chart of FIG. 13A. In the recording start process, the communication monitor 6 first stores session information included in a voice packet (S110). The communication monitor 6 secures the storage area (storage capacity) of a voice file in the external storage apparatus 7 (S111). When the free space of the external storage apparatus 7 is small, an old recorded voice file may be deleted to secure a capacity. Then, the communication monitor 6 generates a date folder and the name of a file in which a voice signal to be buffered is saved (S112), and secures a buffer area, in which the voice signal is buffered, on the RAM of the controller 30 (S113). A storage area for the session information in S110 is also set on the RAM of the controller 30. The date folder is generated based on a date according to each virtual device VDn. Accordingly, no folder is generated in S112 when the folder of the day of the virtual device VDn has been already generated. The names of a folder and a file name are generated in the following manner.

A directory "voice_data [n]" (n is a virtual device number), in which a recorded voice is saved, according to each virtual device VDn (n=1 to 4) is generated in the external storage apparatus 7. As the name of a folder based on a date, generated under each directory, "date at the time of starting saving" is used. For example, the name of a folder, on Sep. 10, 2018, for a virtual device VD1 is "/voice_data1/20180910". Moreover, the file name of a voice file generated based on 100 MB is set at a name generated by adding the kind of a communication to MM (month)/DD (day)/MM (hour)/DD (minute)/SS (second) at the time of starting buffering. The kind of a communication is "_all" in the case of an entire communication, "_group100" ("100" means a group ID) in the case of a group communication, "_uid10" (ID of a transceiver) in the case of an individual communication, "_tel1234" (the phone number of an IP telephone), or the like. For example, the file name of a voice signal in a communication session of group ID100, of which buffering is started at 18:01 on September 10, is "0910180100_group100.wav". Accordingly, for example, a voice signal in a communication session of group ID100, of which buffering is started at 18:01 on Sep. 10, 2018 by the virtual device VD1, is saved as "/voice_data1/20180910/0910180100_group100.wav".

Referring back to FIG. 12, when the buffer area is secured in the recording start process (S93), the communication monitor 6 buffers the voice signal received this time (S94).

When currently, the voice signal of the virtual device VDn is currently being recorded (YES in S92), the session information of the voice packet received this time and the session information saved at the time of starting the recording are compared (S95). When the session information is changed (YES in S95), it is determined that a communication partner is changed, and the recording is temporarily ended (S97), and recording for a new communication session received this time is started (S98).

The recording end process executed in S97 will now be described with reference to the flow chart of FIG. 13B. In the recording end process, first, the communication monitor 6 copies voice data from the buffer to the specified directory of the external storage apparatus 7 to generate a recorded voice file (S115). The file name of the voice file has been described above. The communication monitor 6 opens the buffer region on the RAM (S116), and clears the session information (S117).

In FIG. 12, even in a case in which the session information is not changed (NO in S95), when the size of the buffered voice signal reaches 100 MB (YES in S96), the communication monitor 6 forms the voice signal reaching 100 MB into a file. Therefore, the communication monitor 6 temporarily executes the recording end process (S97), and executes a recording start process (S98) in order to subsequently record a voice signal. After the recording start process (S98), the communication monitor 6 buffers the voice signal received this time (S99). When the session information is not changed in S95 (NO in S95), and the buffer size does not reach 100 MB (NO in S96), the communication monitor 6 buffers the voice signal in the current buffer area (S99).

When a voice packet destined for a virtual device VDn is not received in S90 (NO in S90), the communication monitor 6 determines whether recording is currently being performed, and predetermined stand-by time (for example, 5 seconds) has elapsed (S100, S101). When the recording is currently being performed, and the predetermined stand-by time (for example, 5 seconds) has elapsed (YES in S100 and S101), the communication monitor 6 determines that the communication is ended, and the recording end process is executed (S102).

In a case in which the voice signal included in the voice packet is substantially silent even when the voice packet is received, the voice signal may be regarded as absent, and silence stand-by time may be allowed to progress. In a case in which some kind of message representing session removal is transmitted from the recorder 230 (network communication relay device 4) to the communication monitor 6 when the virtual device is deleted from the column of the participating terminal in the communication session (S43 in FIG. 9, and S53 in FIG. 10), the recording end process may be executed in response to the message.

FIG. 14 are flow charts illustrating a procedure of an individual monitoring process executed by the communication monitor 6.

Figure 14A:
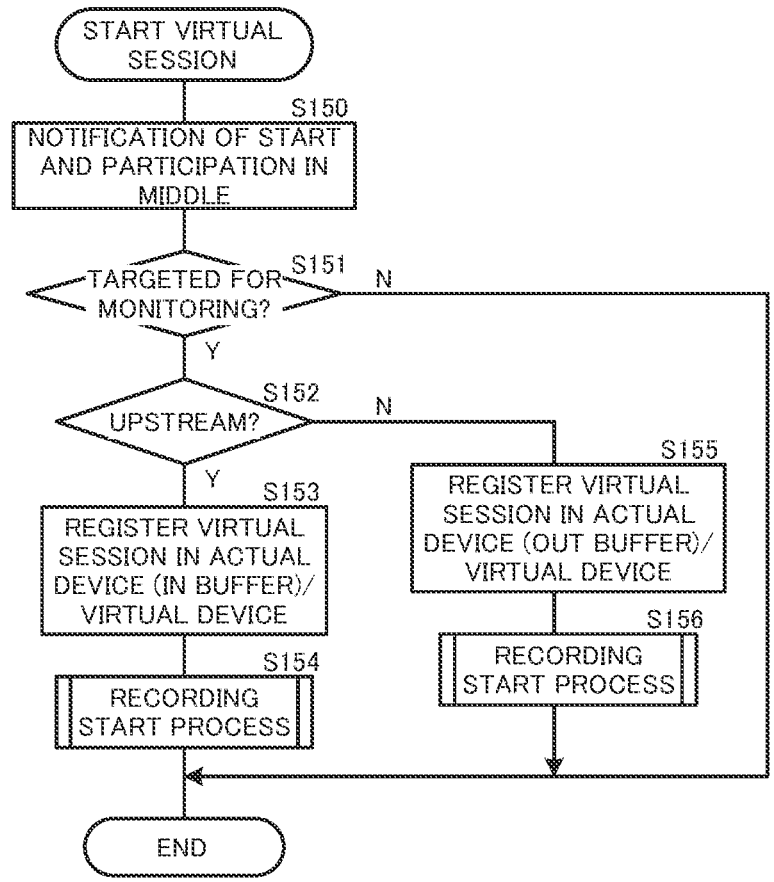
FIG. 14A is a flow chart illustrating a virtual session start process in a communication monitor.

FIG. 14A is the flow chart illustrating a virtual session start process. When a message that a communication terminal participates in a communication session or participates in the middle of the communication session is received from the network communication relay device 4 (S150), the communication monitor 6 determines whether the communication terminal of which the notification has been provided is a communication terminal which is a target for individual monitoring (S151). When the communication terminal is not the target for individual monitoring (NO in S151), the individual monitoring process is ended. When the communication terminal of which the notification has been provided is the target for individual monitoring (YES in S151), the communication monitor 6 determines whether the target for monitoring is an upstream signal or a downstream signal (S152). When the target for monitoring is a targeted for individual monitoring which is the upstream signal (YES in S152), the communication monitor 6 registers, in the virtual mixing table 44-1, a virtual communication session in which the communication terminal and a virtual device for individual monitoring, associated with the communication terminal, participate (S153). The communication monitor 6 executes a recording start process for recording a voice signal transferred to the virtual device (S154: see FIG. 13A). The session information saved in S110 in the recording start process in FIG. 13A is not the virtual session but is information on an actual communication session transmitted from the network communication relay device 4 in S150.

When the target for monitoring is the downstream signal in S152 (NO in S152), the communication monitor 6 registers, in the virtual mixing table 44-2, a virtual communication session in which the output buffer of the communication terminal and a virtual device for individual monitoring, associated with the communication terminal, participate (S155). The communication monitor 6 executes a recording start process for recording a voice signal transferred from the output buffer of the target for monitoring to the virtual device (S156: see FIG. 13A). The session information saved in S110 in the recording start process in FIG. 13A is not the virtual session but is information on an actual communication session transmitted from the network communication relay device 4 in S150.

Figure 14B:
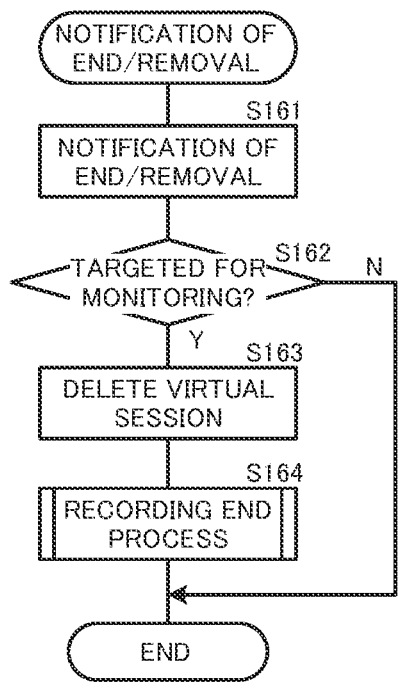
FIG. 14B is a flow chart illustrating an end/removal process in the communication monitor.

FIG. 14B is the flow chart illustrating a virtual session end process. When a message that a communication session in which a communication terminal participates is ended or that the communication terminal is removed from the communication session is transmitted from the network communication relay device 4 (S161), the communication monitor 6 refers to the virtual mixing tables 44-1 and 44-2 to determine whether the communication terminal of which the notification has been provided is a target for individual monitoring (S162). When the communication terminal is not the target for individual monitoring (NO in S162), the communication monitor 6 ends the process. When the communication terminal of which the notification has been provided is the target for individual monitoring (YES in S162), a virtual communication session for the communication terminal registered in the virtual mixing table is deleted (S163), and the recording end process is executed (S164).

Figure 14C:
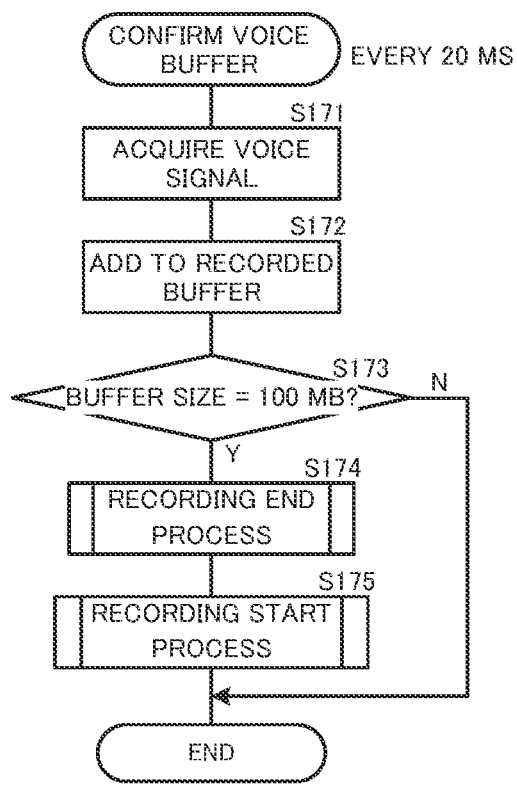
FIG. 14C is a flow chart illustrating a voice buffer confirmation process in the communication monitor.

FIG. 14C is the flow chart illustrating a voice buffer confirmation process. While a virtual session is registered, the communication monitor 6 regularly (for example, every 20 milliseconds) acquires the content of the input buffer of an actual communication terminal participating in the communication session, that is, a communication terminal which is a target for individual monitoring (S171). The content of the input buffer may be null (silence). The communication monitor 6 adds the acquired voice signal to a recorded buffer (S172). In other words, the voice signal of the communication terminal is recorded on a time-series basis including a silence period. The communication monitor 6 confirms the size of the voice signal buffered in the recorded buffer (S173). When the buffer size reaches 100 MB (YES in S173), the communication monitor 6 temporarily executes the recording end process (S174) in order to temporarily form the voice signal into a file, and subsequently executes a recording start process (S175) in order to record a voice signal. When the buffer size does not reach 100 MB (NO in S173), the communication monitor 6 ends the process.

In individual monitoring, a voice signal in a period, in which a communication terminal to be monitored participates in a communication session, including a silence period, is recorded in a time axis, as described above. When a voice signal (having a level that is not less than a predetermined level) is input from any communication terminal participating in a communication session, the signal is recorded in session monitoring. Only when a voice signal is input from a communication terminal to be monitored, the voice signal may also be recorded in the individual monitoring. All voice signals mixed in a communication session in a period including a silence period may also be recorded in the session monitoring.

In the embodiment described above, recorded voice data is in WAV format. However, any encoding format is acceptable. For example, MP3 and the like are also acceptable.

In the embodiment, a buffered recorded voice is formed into a file whenever the size of the buffered recorded voice reaches a predetermined size. However, the buffered recorded voice may be formed into a file whenever recording time reaches predetermined time.

REFERENCE SIGNS LIST

1 Voice communication system
2 Relay apparatus
3 Telephone relay device
3A Interface
4 Network communication relay device
5 Wireless communication relay device
6 Communication monitor
7 External storage apparatus
20 SIP telephone
22 Extension telephone
25 Analog wireless device (repeater)
26 Analog transceiver
27 Digital wireless device (repeater)
28 Digital transceiver
29 Microphone/speaker
34-1 to 34-3 External instrument interface

The invention claimed is:

1. A relay apparatus comprising:
a communicator that communicates with a plurality of communication terminals that performs a voice communication;
a communication session processor in which a call from a certain communication terminal calling the other at least one communication terminal allows the calling communication terminal and the called at least one communication terminal to be registered as participating terminals, a communication session identified based on session information is established, and transmission of a voice signal from any of the participating terminals in the established communication session allows the voice signal to be transmitted, together with the session information, to the other participating terminal in the same communication session; and
a communication monitor that monitors the voice signal in the communication session,
wherein
the communication session processor notifies the communication monitor of information on the participating terminals in the communication session when the communication session is established,
when the communication monitor is notified of information on a communication terminal in response to establishing the communication session, the communication monitor individually inputs and records the voice signal transmitted from the communication terminal so that the voice signal is distinguished from the voice signal from the other communication terminal, or the communication monitor records the voice signal transmitted to the communication terminal in the communication session,
the communication terminal that is a target to be monitored, hereinafter referred to as a target terminal, is associated with a virtual device for individual monitoring, which is configured to monitor only the voice signal that is transmitted or received by the target terminal alone even when the communication session to which a plurality of the communication terminals including the target terminal participate is established, and
the virtual device for individual monitoring is provided with a virtual device for upstream signal individual monitoring that is configured to monitor the voice signal transmitted from the target terminal, and
a virtual device for downstream signal individual monitoring that is configured to monitor the voice signal transmitted to the target terminal,
the virtual device for upstream signal individual monitoring is associated with an input buffer in which the voice signal transmitted from the target terminal, of which the voice signal is recorded, is buffered, and
the virtual device for downstream signal individual monitoring is associated with an output buffer in which the voice signal transmitted to the target terminal is buffered,
when the communication monitor is notified of information on the target terminal in response to establishing the communication session, the communication monitor establishes a virtual communication session to which only the target terminal and the virtual device for individual monitoring are allowed to participate, and the communication monitor records the voice signal transmitted to the virtual device for individual monitoring in the virtual communication session.

2. The relay apparatus according to claim 1, wherein the plurality of virtual devices is disposed, and the communication monitor individually establishes virtual communication sessions in which the plurality of virtual devices participates, respectively.

3. The relay apparatus according to claim 2, wherein the communication session processor notifies the communication monitor of information on the participating terminal in the communication session in response to canceling the communication session, and the communication monitor ends recording of the voice signal of the target terminal when the communication monitor is notified of information on the target terminal in response to canceling the communication session.

4. The relay apparatus according to claim 3, wherein the communication monitor buffers the voice signal in volatile memory, and stores the buffered voice signal as a file in a nonvolatile storage apparatus when a size of the buffered voice signal reaches a size set in advance.

5. The relay apparatus according to claim 2, wherein the communication monitor buffers the voice signal in volatile memory, and stores the buffered voice signal as a file in a nonvolatile storage apparatus when a size of the buffered voice signal reaches a size set in advance.

6. The relay apparatus according to claim 1, wherein the communication session processor notifies the communication monitor of information on the participating terminal in the communication session in response to canceling the communication session, and the communication monitor ends recording of the voice signal of the target terminal when the communication monitor is notified of information on the target terminal in response to canceling the communication session.

7. The relay apparatus according to claim 6, wherein the communication monitor buffers the voice signal in volatile memory, and stores the buffered voice signal as a file in a nonvolatile storage apparatus when a size of the buffered voice signal reaches a size set in advance.

8. The relay apparatus according to claim 1, wherein the communication monitor buffers the voice signal in volatile memory, and stores the buffered voice signal as a file in a nonvolatile storage apparatus when a size of the buffered voice signal reaches a size set in advance.

9. A method of recording a voice communication, wherein in a relay apparatus that communicates a plurality of communication terminals performing a voice communication, a call from a certain communication terminal calling the other at least one communication terminal allows the calling communication terminal and the called at least one communication terminal to be registered as participating terminals, and a communication session identified based on session information is established, transmission of a voice signal from any of the participating terminals in the established communication session allows the voice signal to be transmitted, together with the session information, to the other participating terminal in the same communication session, while the communication session is established, the voice signal transmitted from a preset communication terminal to be monitored, hereinafter referred to as a target terminal, is individually input and recorded so that the voice signal is distinguished from the voice signal from the other communication terminal, or a voice signal transmitted to the communication terminal in the communication session is recorded, the target terminal is associated with a virtual device for individual monitoring, which is configured to monitor only the voice signal that is transmitted or received by the target terminal alone even when the communication session to which a plurality of the communication terminals including the target terminal participate is established, and the virtual device for individual monitoring is provided with a virtual device for upstream signal individual monitoring that is configured to monitor the voice signal transmitted from the target terminal, and a virtual device for downstream signal individual monitoring that is configured to monitor the voice signal transmitted to the target terminal, the virtual device for upstream signal individual monitoring is associated with an input buffer in which the voice signal transmitted from the target terminal is buffered, and the virtual device for downstream signal individual monitoring is associated with an output buffer in which the voice signal transmitted to the target terminal is buffered, a virtual communication session to which only the target terminal and the virtual device for individual monitoring are allowed to participate is established in response to establishing the communication session, and the voice signal transmitted to the virtual device for individual monitoring in the virtual communication session is recorded.

10. The method according to claim 9, wherein the plurality of virtual devices is disposed, and voice signals transmitted to the plurality of virtual devices are separately recorded in parallel.

11. The method according to claim 10, wherein the voice signal is buffered in volatile memory while the voice signal is recorded, and the buffered voice signal is stored as a file in a nonvolatile storage apparatus when the buffered voice signal reaches a size set in advance.

12. The method according to claim 9, wherein the voice signal is buffered in volatile memory while the voice signal is recorded, and the buffered voice signal is stored as a file in a nonvolatile storage apparatus when the buffered voice signal reaches a size set in advance.

* * * * *